US009578374B1

(12) United States Patent
Whitten et al.

(10) Patent No.: US 9,578,374 B1
(45) Date of Patent: Feb. 21, 2017

(54) DVR PLAYLIST PROVISIONING SYSTEM

(71) Applicant: Cox Communications, Inc., Atlanta, GA (US)

(72) Inventors: Robert Clark Whitten, Kennesaw, GA (US); Malcolm Eruteya, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/700,585

(22) Filed: Apr. 30, 2015

(51) Int. Cl.
*H04N 21/262* (2011.01)
*H04N 21/482* (2011.01)
*H04N 21/4147* (2011.01)
*H04N 21/462* (2011.01)
*H04N 21/458* (2011.01)
*H04N 21/2665* (2011.01)
*H04N 21/4627* (2011.01)
*H04N 21/254* (2011.01)
*G06F 17/30* (2006.01)
*H04N 7/16* (2011.01)
*H04N 21/835* (2011.01)
*H04N 21/2387* (2011.01)
*H04N 21/432* (2011.01)
(Continued)

(52) U.S. Cl.
CPC .... H04N 21/4627 (2013.01); G06F 17/30017 (2013.01); H04N 5/91 (2013.01); H04N 7/163 (2013.01); H04N 21/2387 (2013.01); H04N 21/2541 (2013.01); H04N 21/25891 (2013.01); H04N 21/2665 (2013.01); H04N 21/26258 (2013.01); H04N 21/4147 (2013.01); H04N 21/4325 (2013.01); H04N 21/458 (2013.01); H04N 21/4532 (2013.01); H04N 21/4622 (2013.01); H04N 21/4751 (2013.01); H04N 21/47217 (2013.01); H04N 21/4825 (2013.01); H04N 21/835 (2013.01)

(58) Field of Classification Search
CPC .................... H04N 21/26258; H04N 21/4825; H04N 21/4147; H04N 21/4622; H04N 21/458; H04N 21/2665; G06F 17/30017
See application file for complete search history.

(56) References Cited

U.S. PATENT DOCUMENTS 8,869,207 B1 * 10/2014 Earle .................. H04N 21/4622
  725/37
8,949,871 B2 * 2/2015 Chai .............................. 725/10
(Continued)

*Primary Examiner* — Ricky Chin
*Assistant Examiner* — Jason Thomas
(74) *Attorney, Agent, or Firm* — Merchant & Gould

(57) ABSTRACT

A system is provided for the provision of DVR playlists. DVR playlists allow for consumers to manage the availability, arrangement, and type of content to be provided from a DVR such that content items are intelligently added, arranged, played back, and deleted via the DVR playlist. Aspects of the system allow playlists to be created by the system, by the consumer, and in co-operation between the system and the consumer. Content items may also be provisioned, such that a DVR playlist limits playback, while still providing variety and consumer choice. Aspects of the system allow for various seed attributes to affect which content items are automatically chosen to comprise the DVR playlist. Content items may be shared amongst user accounts under a subscriber account so that space on a DVR is more efficiently provisioned.

18 Claims, 10 Drawing Sheets

(51) Int. Cl.
*H04N 21/472* (2011.01)
*H04N 21/475* (2011.01)
*H04N 21/258* (2011.01)
*H04N 21/45* (2011.01)
*H04N 5/91* (2006.01)

(56) References Cited

U.S. PATENT DOCUMENTS

2003/0093790 A1* 5/2003 Logan ............... G06F 17/30265
  725/38
2011/0247038 A1* 10/2011 Roberts ............. H04N 5/44513
  725/46
2012/0066593 A1* 3/2012 Schneider ............. G06F 3/0482
  715/716

* cited by examiner

DVR PLAYLIST PROVISIONING SYSTEM

BACKGROUND

Digital Video Recorders (DVRs) allow consumers of video content to record video content for later viewing. DVRs may be either local or networked-based, and both allow consumers to record and play content on various display devices.

One frequent frustration for consumers is the difficulty and hassle in accessing recorded content from DVRs in a particular order or in frequent succession. Consumers are often forced to manually control the playback of recorded content and must access recorded content separately from streamed content.

Moreover, when multiple consumers are associated under one subscriber, such as the case when a family or set of roommates share a main account with a service provider, video content downloaded may be prematurely deleted by one consumer who has watched the video content before other consumers have had a chance to watch it, forcing repeated downloads and wasting time. Alternatively, the last consumer to watch the video content may not delete the video content, which wastes space on the DVR that could be used for different content items.

It is with respect to these and other considerations that aspects of the present disclosure will be made.

SUMMARY

Aspects of the present invention provide for a DVR playlist to be provisioned. DVR playlists allow for consumers to manage the availability, arrangement, and type of content to be provided from the DVR. Aspects of the system allow playlists to be created by the system, by the consumer, and in co-operation between the system and the consumer. Content items may also be provisioned, such that a DVR playlist limits available content items, while still providing variety and consumer choice.

Aspects of the system that create DVR playlists allow for various seed attributes to affect the content items chosen to comprise the DVR playlist. Attributes include: time, content duration, consumer preferences, consumer viewing history, the viewing history of other users, account details (e.g., access to premium content), locally stored content, broadcast schedules, DVR storage capacity, etc.

Aspects of the system that manage DVR playlists allow for content items to be intelligently added, arranged, played back, and deleted. Content items may be shared amongst user accounts under a subscriber account so that space on a DVR (networked or local) is more efficiently provisioned.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1:
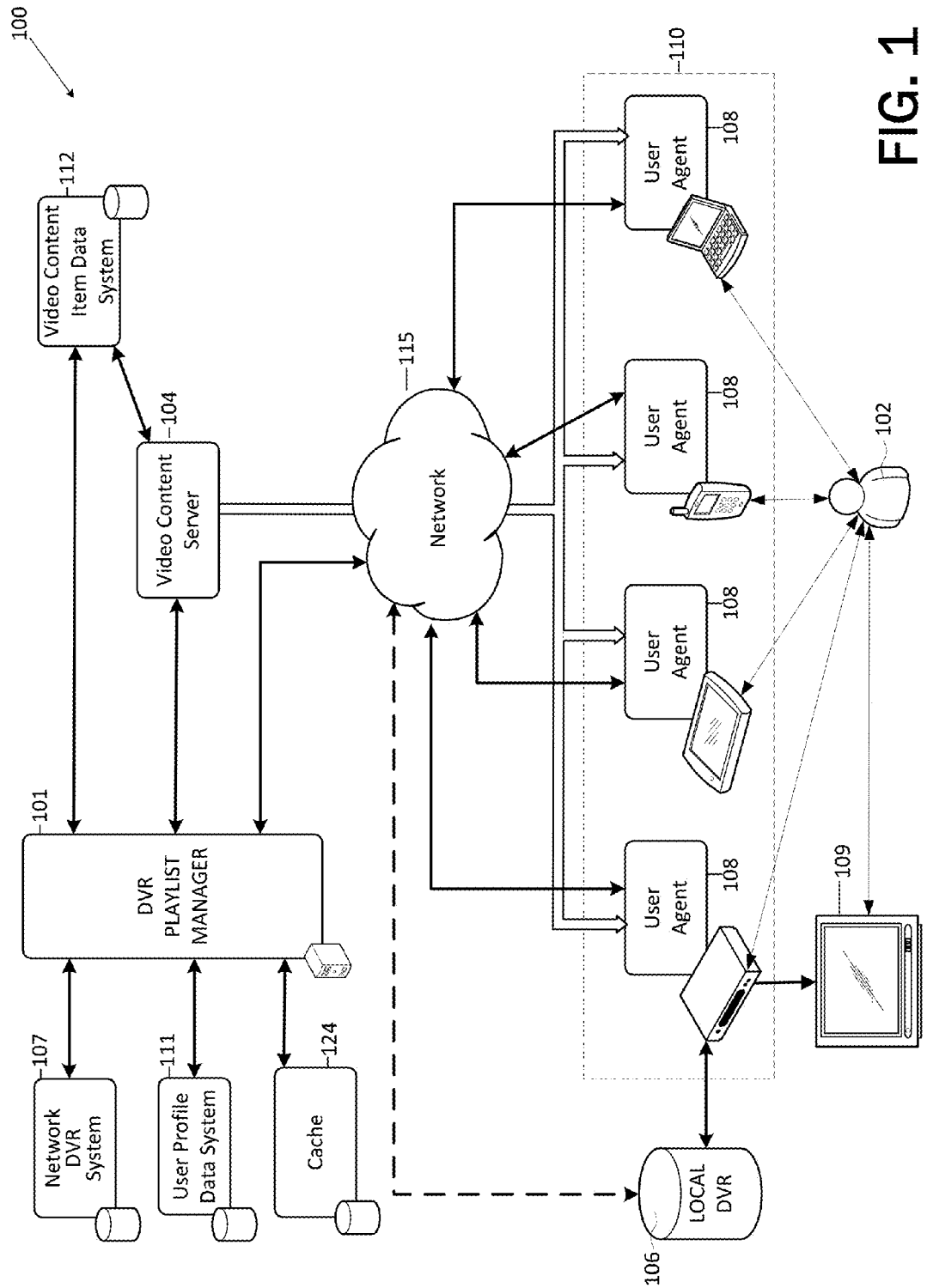
FIG. 1 is a simplified block diagram of aspects of a system for providing and managing DVR playlists.

As briefly described above, a system for provisioning DVR playlists is disclosed. Aspects of the system allow consumers to set up and manage DVR playlists manually. The system is also operable to suggest system-generated DVR playlists to the consumer based on a series of attributes. The consumer may accept the system-generated DVR playlist or make modifications to the DVR playlist.

The attributes used in generating the DVR playlists include attributes related to the consumer's past behavior, the behavior of other users, content metadata, and DVR status. Aspects of the system allow for different weights to be placed on different attributes when generating DVR playlists and for the consumer to adjust those weights.

Aspects of the system allow for some attributes to be collected automatically and for others to be input by the consumer. For example, consumers can input that they are "in the mood for" a comedy, so that the system knows to suggest content tagged as comedy. Additionally, when the system is seeking comedy content, it is operable to automatically examine past (i.e., prior-collected) consumer behavior to determine what sort of content that the consumer previously found comedic so that content with higher relevancy is presented to the consumer. A mood is one example of a seed, which indicates metadata to base a DVR Playlist on. Seeds are used as the basis for content recommendations, and include: consumer moods, content items, existing DVR Playlists, the viewing habits of the consumer, the viewing habits of other persons, sponsored content, etc.

The consumer can also manually create a DVR playlist according to aspects of the system. A manually created DVR playlist includes content arranged for playback at the consumer's determination, but according to some aspects also includes branching determinations, so that a consumer can determine to watch distinct programming within a subset of programming. For example, a consumer with two children with different tastes in programming can create DVR playlists for each child limited to age-appropriate programming set to branch at the end of playback of one content item to the other child's DVR playlist, so that no one child can dominate the television; the children are forced to take turns in whose programs are shown.

Aspects of the system also allow for the efficient deletion of content. Multiple persons may be associated with the consumer's DVR, such as, for example, when a household has multiple members using one subscriber account with a service provider. For example, when two roommates both place an episode of "Seinfeld" on their respective DVR playlists, only a single download of that episode onto a subscriber account DVR is necessary to provision it to both roommates, however, if either roommate deletes the episode, the other will need to re-download it. Alternatively, if neither roommate deletes the episode after watching it (e.g., they are overly cautious about deleting content items, or are forgetful), the episode may take up space on the subscriber account DVR that could be better used for new or unwatched content items. Aspects of the system allow for content items to be removed or marked as watched from DVR playlists without deleting the content items from the DVR. Additionally, other aspects of the system allow for content items to be automatically deleted from the DVR when the content no longer appears on, or is marked as watched on, the DVR playlists associated with the DVR storing the content item.

These aspects may be combined, other aspects may be used, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described FIG. 1 is a simplified block diagram of aspects of a system 100 for providing and managing DVR playlists. The DVR playlist system 100 allows a video content provider to provide DVR playlist functionality to an endpoint device 110. Examples of video service providers include providers of video programming, such as, but not limited to, multiple system operators, cable television (CATV) services system operators, direct-to-home (DTH) or direct broadcast satellite (DBS) operators (i.e., satellite system operators), terrestrial (i.e., over-the-air) broadcast system operators (e.g., networks and stations), Internet protocol television (IPTV) system operators, Internet television system operators, and Internet service providers.

Components of the DVR Playlist system 100 may operate as a distributed system where each component is accessed via a suitable network, or various components of the system may operate together as an integrated system. As illustrated, the DVR Playlist system 100 includes a DVR Playlist manager 101 in communication with a video content server 104. The video content server 104 streams video content items to endpoint devices 110 over a network 115. Networks suitable for use with the DVR Playlist system 100 include, but are not limited to, one or more of a television service provider content delivery network, the Internet, a wide area network, and a local area network. Examples of suitable endpoint devices 110 include, but are not limited to, digital set-top boxes (STBs), personal computers, tablet computing devices, smart phones, smart televisions, digital media players, and game consoles. A user agent 108 running on the endpoint device 110 receives the content stream and renders the content item on a display 109 associated with the endpoint device 110, such as an external display (e.g., a television set, a computer monitor, a projector, etc.) or a screen integrated in the endpoint device 110. A local DVR 106 is illustrated as in communication with one endpoint device 110, but multiple endpoint devices 110 may optionally be in communication with a local DVR 106 via the network 115. Alternatively, the local DVR 106 can be implemented according to some aspects as internal computer-readable storage media in one or more endpoint devices 110, such as a DVR integrated in an STB.

Content items include live and pre-recorded programs streamed as linear programming (e.g., the program lineup on a particular channel). Content items also encompass non-linear programming from a video on-demand system. As is understood, content items can be grouped into a series comprising discrete episodes (or editions) and series may be subdivided into seasons. For example, each nightly broadcast of the evening news may be referred to as an edition (i.e., each broadcast) within the series (i.e., the nightly news). In another example, the television series "Star Trek" comprises several hour-long episodes, wherein the episodes are subdivided into seasons based on an original broadcast date.

The DVR Playlist manager 101, according to some aspects, is in communication with one or more data systems, such as, but not limited to, a video content item data system 112, a user profile data system 111, and a network DVR system 107.

In operation, the consumer 102 is in communication with the endpoint device 110 to view content items and to make selections regarding content items. Selecting content items includes creating, managing, and being presented with DVR playlists. DVR playlists, according to various aspects, can be stored locally on an endpoint device 110 or remotely by the DVR Playlist manager 101. DVR playlists may be shared between multiple endpoint devices 110 and may be associated with individual consumers 102 or a collection of consumers 102 associated with a subscriber account with a video service provider according to various aspects.

To manage DVR Playlists, aspects of the DVR Playlist manager 101 are operable to retrieve attributes related to the consumer's past behavior, the behavior of other users, content metadata, network status, and DVR status. Past consumer behavior includes data related to, but not limited to: content items viewed by the consumer, content items presented to but rejected by the consumer for viewing, the portion of a content item viewed by a consumer, order of viewing content items, consumer-input preferences or commands, and consumer permission levels. The behavior of other users includes past consumer behavior for persons or subscriber accounts other than the consumer 102 as well as relational data between the consumer 102 and the other user, including, but not limited to, whether a social-media relationship exists between the consumer 102 and the other user, whether a consumer-input preference or command establishes a relationship, whether a demographic relationship exists (e.g., both the consumer and the other user identify as a household with: common ethnicities, common income levels, adults over the age of 65, children under the age of 10, etc.) and whether a geographic relationship exits (e.g., the consumer and the other user reside in the same ZIP code, reside in the same neighborhood, receive content from the same service provider, etc.). Content metadata includes data about the content data (i.e., metadata) such as running time, language options, cast information, popularity data, critical review data, date of premiere, relationship data with other content items (e.g., sequels, remakes, common cast, etc.), and content advisories (e.g., violent content, adult situations, drug use, etc.). Attributes related to DVR status include, but are not limited to, available storage capacity of the DVR, whether the DVR is local or network-based, processing speed of the DVR, physical status of the DVR (e.g., on/off status, number of tuners available, active playback/standby mode, etc.), etc.

The DVR Playlist manager 101 uses the attributes to manage how to provide consumers 102 with content items. According to one aspect, a consumer 102 manually creates a DVR playlist to be managed for exact provision by the DVR playlist manager 101. For example when the consumer 102 selects the first three episodes of a television series for back-to-back, sequential provision, the DVR Playlist manager 101 retrieves each episode from the video content server 104 and streams the first, second, and then third episodes to a designated endpoint device 110 such that there are no interruptions between the playback of each episode. According to another aspect, the consumer 102 may prompt the DVR playlist manager 101 that the consumer 102 wishes to watch dramatic content items viewed by the consumer's co-workers (for example, to be ready to discuss the content items the next day at work), which the DVR playlist manager 101 will interpret as a command to examine the behavior of other users who qualify as co-workers to present the consumer 102 with a DVR playlist containing candidate content items to watch, which the consumer 102 is prompted to select from before provisioning content items from the video content server 104 to a designated endpoint device 110.

The DVR Playlist system 100 includes a cache 124 operable to store various types of information. For example, for a given session, data relating to a consumer's consumption patterns are temporarily stored in the cache 124 for use by the DVR Playlist manager 101 before the data is stored in the user profile data system 111. The cache 124 is illustrated in FIG. 1 as a remote element, but may be integrated with the DVR Playlist manager 101.

As another example, if the consumer 102 selects to access a content item recorded on a network DVR system 107, the DVR Playlist manager 101 is operable to access the content item from the consumer's network DVR system 107, send the video content item for display on an endpoint device 110, and update the DVR playlist accordingly.

According to some aspects, the DVR Playlist manager 101 may be a software application having sufficient computer executable instructions for performing the functions described herein. The DVR Playlist manager 101 may operate as part of a video content service provider system or as a standalone application or service that may be called on by any service or content service provider system that can communicate over the network 115 for providing the functionality described herein.

Figure 2:
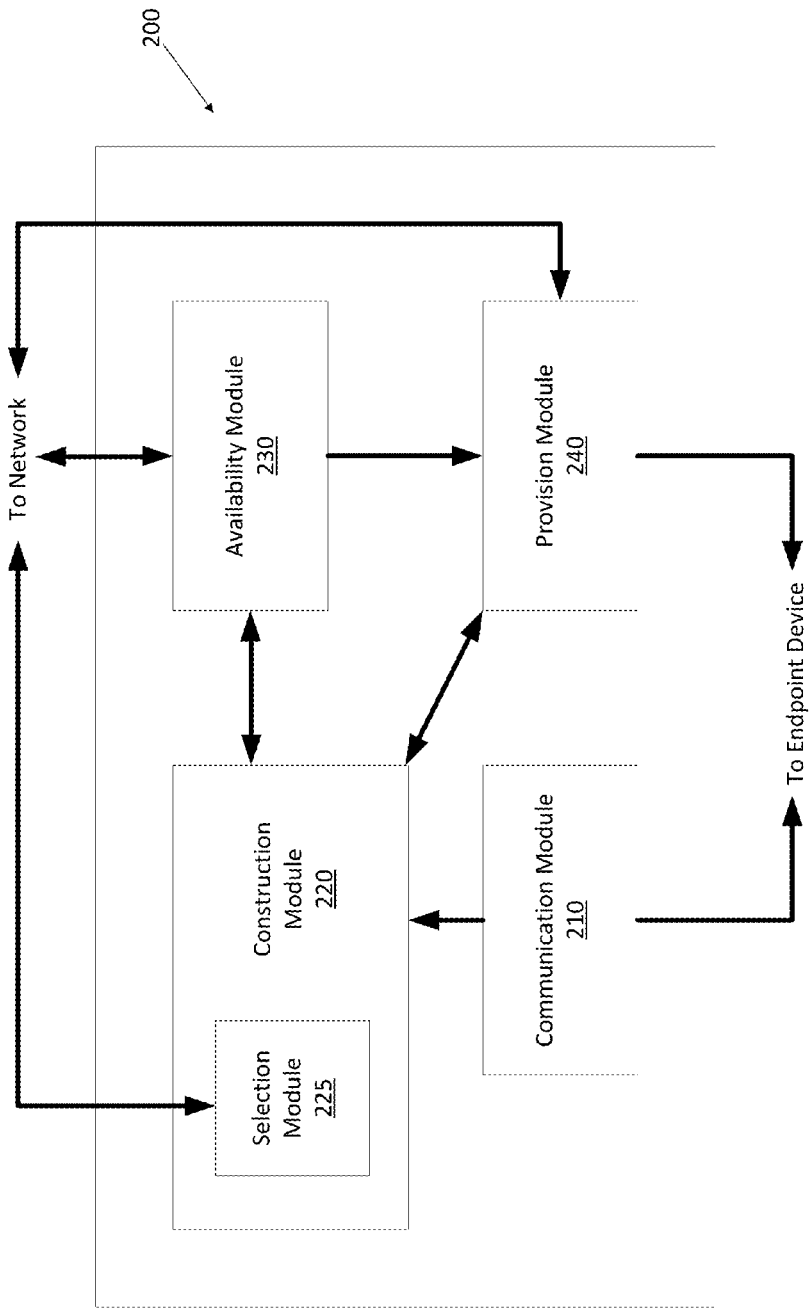
FIG. 2 is a simplified block diagram of aspects of a DVR Playback management system.

FIG. 2 is a high level block diagram of a Playlist Engine 200 for creating and provisioning DVR playlists. The Playlist Engine 200 is executable in hardware and in software according to aspects of the invention, and may be implemented locally on an endpoint device 110 or remotely on a server or similar hardware operated by a service provider.

The Playlist Engine 200 includes a communication module 210, operable to receive communications indicating which content items a consumer 102 wants to be played back via an endpoint device 110. The communication module 210 parses the communications, and transmits them to a construction module 220, which is operable to build a playlist comprising the indicated content items. According to various aspects, the construction module 220 includes a selection module 225 operable to parse the communications to interpret a seed, wherein the seed indicates which content items the consumer 102 wants to be played back based on a metadata analysis. The construction module 220 is in communication with an availability module 230, which stores subscriber account permissions, and is operable to locate content items to build a DVR playlist with and determine whether those content items comply with the subscriber account permissions. The construction module 220 and availability module 230 are in communication with a provision module 240, which is operable to determine an order to play back the content items that comprise a DVR playlist and to enable the playback of those content items according to the order on the endpoint device 110.

The communication module 210 is operable to receive communications from an endpoint device 110, directly or indirectly, that indicate what content items a consumer 102 wants to use as part of a DVR playlist. According to various aspects, a consumer 102 may communicate which content items comprise a DVR playlist manually, use a content item (or multiple content items) as a seed for the Playlist Engine 200 to build a DVR playlist from, direct the Playlist Engine 200 to build a DVR playlist from a seed, or select a pre-built DVR playlist to start or continue playback from.

The construction module 220 is operable to build DVR playlists for an improved provisioning of content items. DVR playlists are comprised of content items, and according to some aspects, may include auxiliary data necessary for the titling, listing, management, ordering, etc., of those content items as part of a DVR playlist. Building a DVR playlist includes creating a DVR playlist and expanding a DVR playlist by adding content items, and in some aspects, updating any auxiliary data to reflect the building process where appropriate. The auxiliary data, in some aspects, enable the DVR playlist to be portable between service providers, so that, for example, a consumer 102 can use a DVR playlist generated by a friend who has a different service provider. The construction module 220 is in communication with the availability module 230 so that the DVR playlist is built from content items that are available to the consumer 102. Other aspects allow the construction module 220 to build a DVR playlist with placeholders for content items that are not yet available to the consumer 102, such as, for example, a pay-per-view content item that the consumer 102 has not yet purchased or a yet-to-premiere episode of a TV show, which the construction module 220 is operable to replace when the content item becomes available, such as, for example, when the example pay-per-view content item is purchased or the example TV episode premieres.

In aspects in which content items are not (exclusively) added manually by a consumer 102, a selection module 225 of the construction module 220 is invoked. The selection module 225 is operable to determine which content items are to be added to a DVR playlist. To make this determination, the selection module 225 parses the communications to determine a seed to match content items to. In various aspects, a seed may be explicitly communicated, such as, for example, when a consumer 102 selects a "mood" via a user interface as described below in relation to FIG. 3B, or implicitly communicated, such as, for example, when a consumer 102 uses a content item as a seed as described below in relation to FIG. 3C. Content items that have metadata matching the communicated seed (e.g., content items tagged as "comedy" are matched with a "Comedy" mood) are selected to automatically build a DVR playlist with. As will be understood, content items can contain significant amounts of metadata and the selection module 225 is operable to weigh the various metadata based on consumer history to provide more relevant content items. For example, a content item with "comedy" metadata may also have subcategories of metadata (e.g., "dark comedy," "musical comedy," "animated," "slapstick," etc.) or compositional metadata (e.g., "movie," "sitcom," actor/actress data, date of premiere, critical reception, etc.) that the selection module 225 uses to refine the selection of content items. Content items may also belong to multiple categories, such as, for example, "Comedy" and "Drama." The selection module 225 is operable to identify content items with metadata that match the seed and further analyzes the consumer history to determine additional subcategorical and compositional metadata to determine consumer preferences (e.g., dark comedies, comedies from the 1960s, content involving James Earl Jones, etc.). Preferences may be weighted by the selection module 225 or be pre-weighted by a user profile data system 111 based on the consumer history, or manually weighted by a consumer 102 via preferences or explicit communication of the weighting to be used. As will be understood, when a content item has a higher weighting, the selection module 225 is operable to choose that content item over a different content item having a lower weighting. Various aspects allow for the selection module 225 to be in communication with the network to access data necessary to execute its functions without having to store that data within or local to the Playlist Engine 200.

The availability module 230 is operable to locate content items that comprise the DVR playlist and to determine whether the consumer 102 is allowed to access those content items (i.e., whether a content item complies with subscriber account permissions). The availability module 230 is operable to locate content items present on a DVR associated with the consumer 102, on a service provider's CDN, or on a third-party CDN/other third-party service available to the consumer (e.g., a streaming site on the internet, a storage site on the internet, NetFlix®, Amazon®, etc.). The availability module 230 is operable to store subscriber account permissions for the consumer 102 (e.g., parental controls, service provider account information, username/password pairs for third-party services, credit card authorizations, etc.) to determine whether a located content item is an available content item for the consumer 102. For example, if the availability module 230 locates a copy of a content item that is rated TV-MA, but parental controls block content items rated TV-MA, the located content item is determined to not be available. According to aspects, the availability module 230 will not search for content items from locations that the subscriber account permissions do not allow (e.g., the availability module 230 will not search NetFlix® when the subscriber account permission do not include NetFlix® account information). The availability module 230 is in communication with the network to access and locate the content items to determine their availability, the construction module 220 to receive and modify playlists, and the provision module 240 to indicate whether the content items comply with subscriber account permissions.

The provision module 240 is operable to determine an order for playback of available content items from a playlist and to enable the playback of those items. Enabling the playback of content items, according to various embodiments, includes uploading (or causing a download) of a content item to an endpoint device 110 or an associated storage device, providing an endpoint device 110 credentials and location data for accessing the content item, tuning an endpoint device 110 to receive the content item via a stream or broadcast, and pointing a content provider to the endpoint device 110 and initiating a stream of the content item. The order for playback includes playback orders that are sequential (e.g., after the currently-displayed content item terminates the one next-to-be-displayed content item is determined for playback) or branching (e.g., multiple content items are presented as potentially being the next-to-be displayed content item). Both sequential and branching playback may be set according to a fixed order or a random order. According to some aspects, when branching playback is set to a fixed order, a given content item that is presented, but not selected as the next-to-be-displayed content item, will be presented after each termination of the currently-displayed content item until it is selected or explicitly rejected.

The provision module 240 is operable to provide branching playback with one DVR playlist or multiple DVR playlists. When multiple playlists are used in branching playback, the provision module is operable to only present content item from one DVR playlist at a time. For example, if a parent sets up playlist one with episodes of "Transformers" and "Pokémon" for a first child and playlist two with episodes of "Arthur" and "Dora the Explorer" for a second child, the provision module 240 will prompt for a selection between "Transformers" and "Pokémon" for playback and, at termination of the selected content item from playlist one (i.e., either "Transformers" or "Pokémon"), prompts for a selection between "Arthur" and "Dora the Explorer" from playlist two for playback. Aspects of the provision module allow for an endpoint device 110 to be locked into the provision of DVR playlists to thereby provide a limited viewing environment, thus only allowing playback from approved DVR playlists. In this manner, provision module 240 can force variety in playback while simultaneously maintaining limited access.

FIGS. 3A-D are illustrations of user interfaces (UI) 310, 320, 330, 340 enabling the building of DVR Playlists. The UI 310, 320, 330, 340 are presented for interaction with the consumer 102 on display 109. Other UI are possible, and UI 310, 320, 330, 340 are given as non-limiting examples.

Figure 3A:
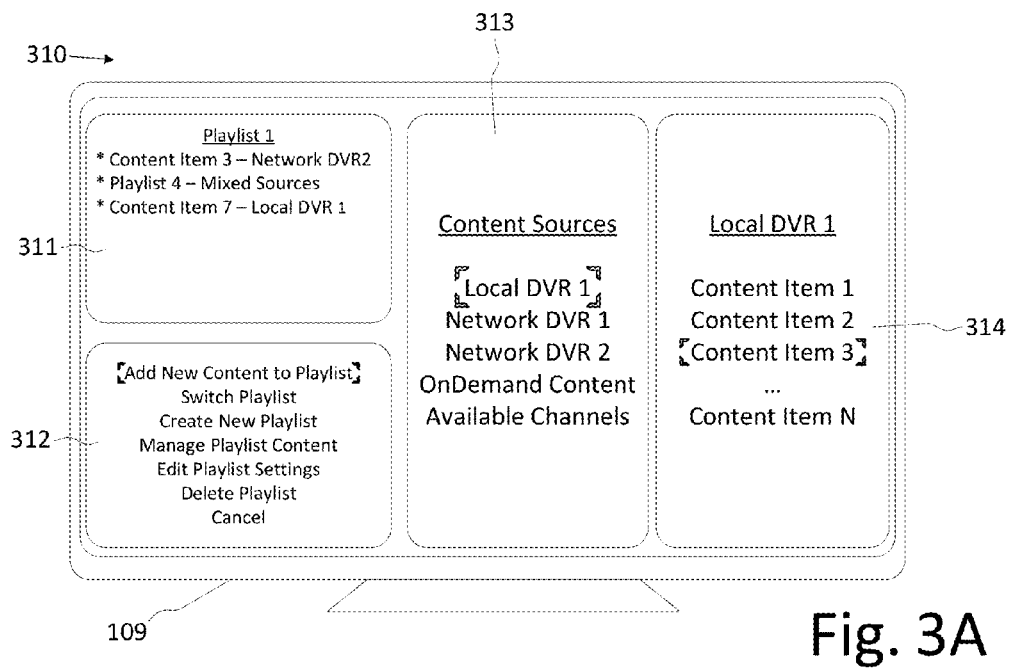
FIGS. 3A-D are illustrations of user interfaces enabling the building of DVR playlists.

In FIG. 3A, a UI 310 for manually managing DVR Playlists is illustrated. In the illustrated aspect, the consumer 102 has navigated the UI 310 to select Content Item 3 from Local DVR 1 (106) to Add to Playlist 1. To enable this navigation, a DVR playlist composition window 311 is provided to enable the consumer 102 to determine what content items and other playlists currently compose a selected DVR playlist. The consumer 102 is also provided a command selection window 312, from which a consumer 102 can select various commands related to DVR playlist management, including, but not limited to: Add New Content to Playlists, Switch Playlists, Create New Playlists, Manage Playlist Content (e.g., removing content, sequential reordering, setting branching playback, etc.), Edit Playlist Settings (e.g., associated consumers, parental permissions, retention policies, etc.), Delete Playlist, and Cancel.

In the illustrated aspect of UI 310 in FIG. 3A, a consumer 102 has highlighted the command "Add New Content to Playlist" from command selection window 312. In response to the consumer command, UI 310 presents a first refinement window 313. In first refinement window 313 the consumer 102 has highlighted "Local DVR 1," which prompts the UI 310 to provide second refinement window 314. The refinement windows 313, 314 are operable to provide the consumer 102 with more detailed commands based on the entered commands from the command selection window 312 and any previous refinement windows, similar to a menu system. More or fewer refinement windows are presented according to different commands and different aspects of UI 310.

Figure 3B:
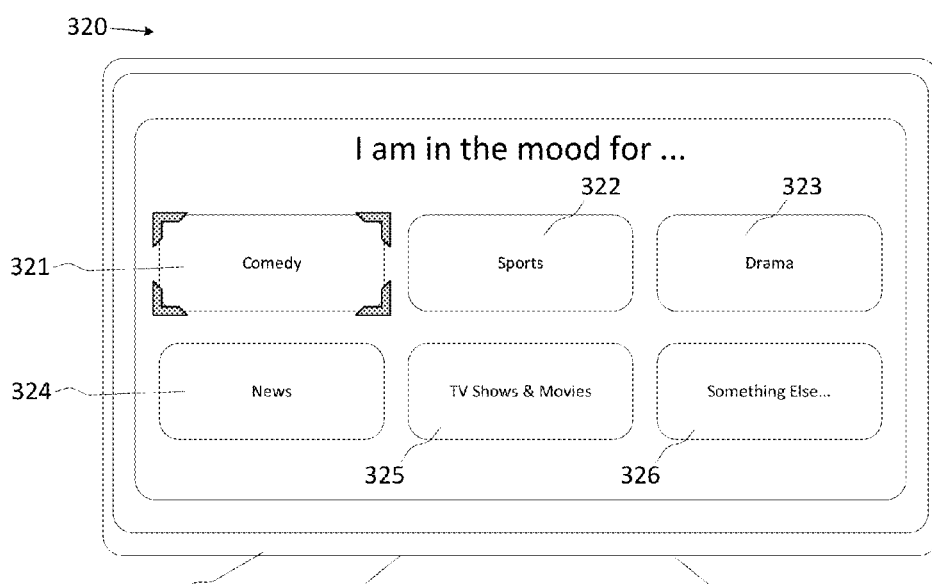

In FIG. 3B, a UI 320 for setting a seed for automatically creating a playlist is illustrated. Several mood options 321, 322, 323, 324 are provided for the consumer 102 to select from to provide the system with a basis for a DVR playlist.

A content toggle 325 is also provided to the consumer 102 to select what type of content items are to be included in the DVR playlist. As is illustrated in FIG. 3B, the DVR playlist will be built from both TV shows and Movies, but if the consumer 102 selects the content toggle 325, the content to build the DVR playlist will cycle through different options (e.g., TV shows, Movies, On-Demand Content, TV shows and Movies, etc.) A refinement option 326 is also provided so that new, non-standard or consumer-defined mood options are provided to the consumer 102, such as, for example, "Science Fiction" or "Children's Programming" moods (not illustrated). Once the consumer 102 has selected a seed, such as the highlighted mood option 321 for Comedy, the system will automatically generate a DVR playlist based on the selected mood option and the displayed content type on content toggle 325, and begins provisioning the content items to the consumer 102.

Figure 3C:
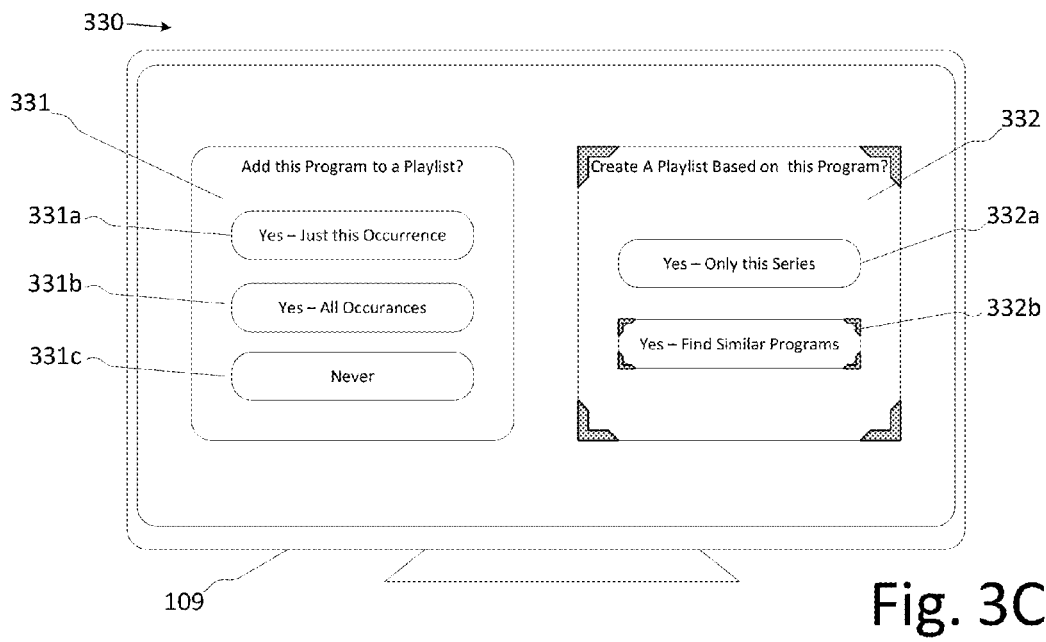

In FIG. 3C, a UI 330 for building a DVR playlist in response to a content item is illustrated. UI 330 is illustrated with two sub-aspects: an additive UI 331, which is provided to enable the consumer 102 to add a currently-displayed (including recently-completed) content item to an existing playlist, and a creative UI 332, which is provided to create a new DVR playlist based on the currently-displayed content item.

Additive UI 331 is illustrated with three options: a "Just this Occurrence" option 331a, an "All Occurrences" option 331b, and a "Never" option 331c. Option 331a enables the currently-displayed content item to be added to a DVR playlist. When multiple DVR playlists exist within the system, a sub-dialog is generated in aspects of the system to allow the consumer 102 to select which DVR playlist the content item should be added to.

Option 331b enables all occurrences of the currently-displayed content item to be added to the DVR playlist, such that, for example, when the consumer 102 selects option 331b while watching the "Nightly News" on Monday, the system will know to add Tuesday's edition of the "Nightly News" to the DVR playlist. Another aspect of option 331b is that the system is enabled to find On-Demand and previously recorded content items, such that, for example, when the consumer 102 selects option 331b while watching season 1, episode 3 of "Star Trek," the system will know to add additional episodes of "Star Trek" to the DVR playlist so that episodes 1 and 2 of season 1 of "Star Trek" are added to the DVR playlist as well as the rest of the season. Various aspects of the system allow for all of the episodes of a series to be added, all of an individual season of a series to be added, or a set number of episodes to be added, based on system default settings and user preferences. Aspects also allow for at least some of the content items to be added to the DVR playlist without downloading those content items, so that a consumer 102 can keep track of content items desired to be watched without filling an associated DVR beyond its capacity to store those content items. Aspects of the system allow for future episodes of an on-going season to be added to the DVR playlist and for those episodes to be provisioned once they have premiered.

Option 331c prevents the currently-displayed content item from being added to a DVR playlist. The system is operable to distinguish from a consumer 102 not choosing to add a content item to a DVR playlist (such as, for example, when a "cancel" or "back" command is issued) and selecting a "Never" option 331c. When a "Never" option 331c has been selected, aspects of the system are enabled to prevent the content item or related content items (e.g., other episodes from a series) from being added the DVR playlist or to future-generated DVR playlists. A "Never" option 331c can be of particular utility to prevent the system from re-recommending content items that the consumer 102 does not care for.

Creative UI 332 is illustrated with two options: "Only this Series" option 332a, and "Find Similar Programs" option 332b. Similarly to option 331b, aspects of option 332a allow for all or a portion of a series to be added to the DVR playlist.

Option 332b enables the system to build a DVR playlist using the currently-displayed content item as a seed, which is used to find similar content items. Similar content items to include in the DVR playlist are chosen by the system based on common metadata and the viewing history of other users—determining a correlation of other users including both a prospective content item on a DVR playlist and the seed content item. According to various aspects, the seed content item's metadata is analyzed to determine a tone for the seed content item that is used as the seed data. According to one aspect, the tone is matched to an existing mood option, such as those discussed in relation to FIG. 3B. Aspects of the system allow for checking compliance with subscriber account permission so that content items for which the consumer 102 does not have rights to (e.g., a lapsed premium content subscription) or that have been blocked (e.g., by parental controls, by a remembered "Never" command, etc.) to be removed from or not added to a DVR playlist, so that only desired, available content items are included in the DVR playlist.

For example, consumer 102 selecting option 332b in response to having an episode of "Star Trek: The Next Generation" as the currently displayed content item, the system provisions a DVR playlist as described herein. The system adds two other episodes of "Star Trek: The Next Generation" based on metadata as two of the highest rated episodes of the currently-displayed content items' series. The system adds the first episode of "Star Trek: Deep Space Nine" based on metadata establishing a relationship between the two series (e.g., common name, common cast, inserted metadata links, etc.). The system adds the movie "Star Wars: The Empire Strikes Back" based on metadata establishing a common genre. The system attempts to add an episode of "Babylon 5" based on viewing history of other users establishing a correlation between "Babylon 5" and "Star Trek: The Next Generation," but because "Babylon 5" is only available via a premium subscription, which consumer 102 lacks, "Babylon 5" is not added to the DVR playlist.

The system, once content items have been identified, is operable to arrange the content items on the DVR playlist and provide the content items to the consumer 102 for viewing. One aspect of the system allows for "multi-part episodes" to be identified for back-to-back play, such that, in the above example, if the two episodes of "Star Trek: The Next Generation" previously added can be identified by metadata (including episode titles) as a two-part episode, the arrangement in the DVR playlist will preserve their sequential nature (i.e., the first episode will be presented prior to the second episode and no content items will be provisioned on the DVR playlist between the two). One of ordinary skill will understand that more and different metadata or aspects of prior viewing history of other users (and combinations thereof) may be used in determining whether to provision a content item based on a seed content item and that the examples described herein illustrate but one possible aspect.

Figure 3D:
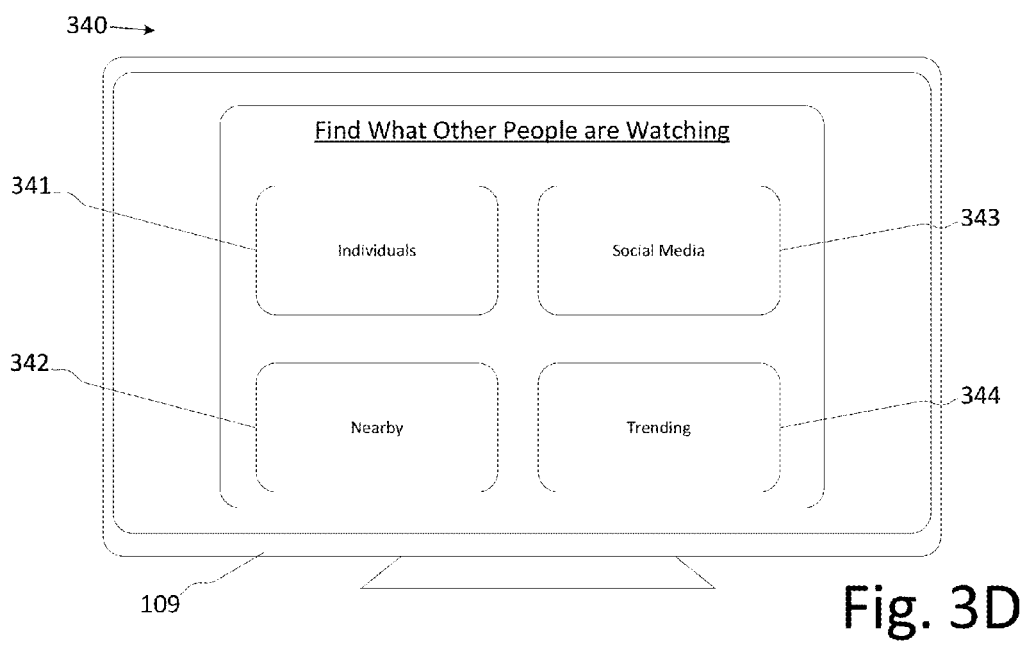

In FIG. 3D, a UI 340 for building a DVR playlist based on the viewing habits of other users is illustrated. Several options for how to build a DVR playlist are possible, of which four are illustrated: "Individuals" option 341, "Nearby" option 342, "Social Media" option 343, and "Trending" option 344.

"Individuals" option 341 enables the system to create a DVR playlist based on another consumer or consumers 102. For example, a consumer 102 may wish to keep up-to-date on programs viewed by co-workers or friends. The system is operable to accept an identifier, such as a user name, subscriber number, etc., to identify the other consumer and to look for content items on that other consumer's DVR playlist or prior viewing history. For security reasons, the system may prompt the other consumer to allow the sharing of DVR playlists or prior viewing history with the consumer 102 before sharing, may require a passcode from the consumer 102 provided by the other consumer, may be limited to DVR playlists marked by the other consumer as "public," etc.

"Nearby" option 342 enables the system to create a DVR playlist based on the aggregated DVR playlists or viewing habits of other users in a defined geographic area. For example, other users considered nearby can include in various aspects, other users within the same postal code, within the same neighborhood, served by the same head-end server, served by the same service provider, or within a fixed radius of the consumer 102.

"Social Media" option 343 enables the system to create a DVR playlist based on the parsed references made by social media contacts. For example, a consumer 102 can link a service provider account with a social media account (e.g., Facebook®, MySpace®, LinkedIn®, eHarmony®, etc.) so that the system can create playlists to keep the consumer 102 up to date on programs viewed by social media contacts. In one example, a consumer 102 has a playlist created based on Facebook® contacts, including direct contacts and contacts of direct contacts, so that comments including the names of content items and profile information related to content items are parsed to build a DVR playlist containing those content items. Similarly in another example, a consumer 102 has a playlist based on eHarmony® matches who are above a certain compatibility score so that the consumer 102 can watch content items flagged by potential dates so that the consumer 102 and potential date have more to talk about.

"Trending" option 344 enables the system to create a DVR playlist based on the inclusion of a content item in DVR playlists or the viewing habits of other users over a period of time compared against a baseline inclusion rate. The system is operable to note changes in rate of viewing or adding content items to DVR playlists across a population of users so that a rising or a falling popularity of the content item can be noted. Additionally, the system is operable to note when a certain percentage of a population of users have viewed or added a content item to a DVR playlist and note the associated content item as having a high popularity. When a consumer 102 selects a Trending option 344, the system builds a DVR playlist comprised of content items that are noted as having rising or high popularity, so that the consumer 102 can keep pace with trends in viewing popular content items.

Figure 4A:
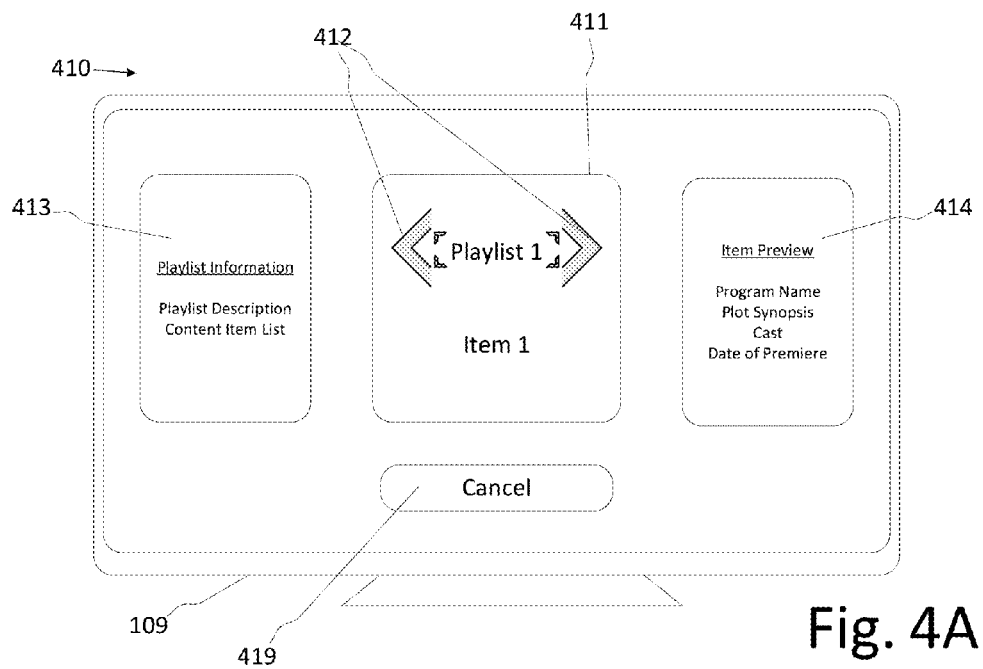
FIGS. 4A-B are illustrations of user interfaces enabling the playback of DVR playlists.
Figure 4B:
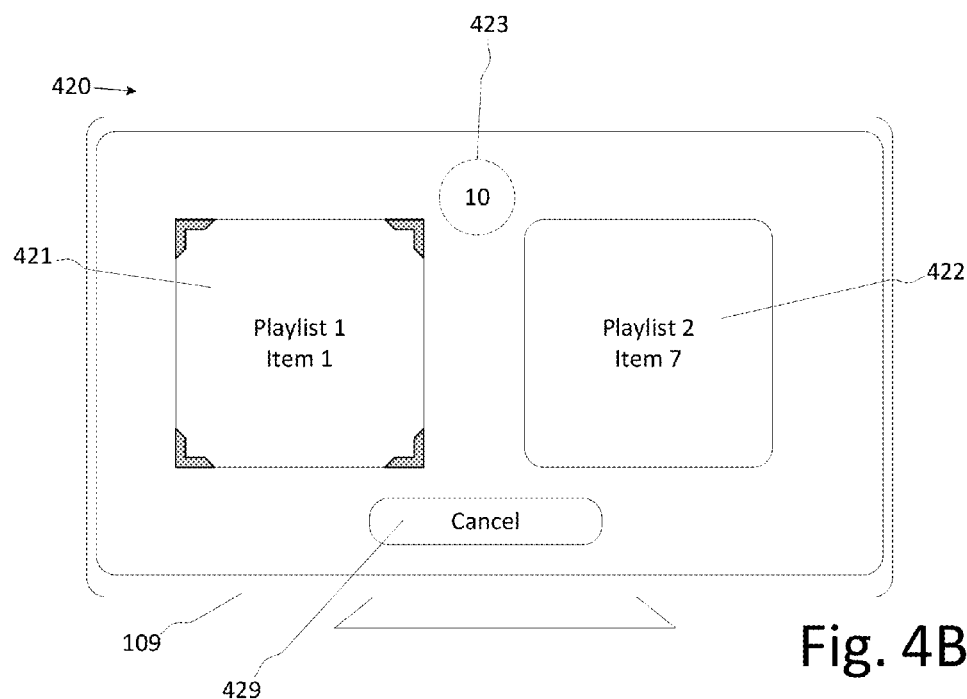

FIGS. 4A-B are illustrations of UIs 410, 420 enabling the playback of DVR playlists. Aspects of the system allow for immediate playback of a DVR playlist or for storage and subsequent playback on a display 109. Other UIs are possible, and UIs 410, 420 are given as non-limiting examples.

In FIG. 4A, a playback UI 410 is illustrated. A command window 411 is illustrated as displaying a playlist and a content item, in which a consumer has highlighted the playlist. The playback UI 410, on receiving an indication that the playlist is highlighted is operable to provide the consumer 102 with navigation icons 412, to enable a consumer 102 to navigate potential playlists. For example, the consumer 102 can select the navigation icons 412 to change the highlighted playlist from playlist 1 to playlist N. Similarly, when the content item is highlighted in the playback UI 410 aspects allow the navigation icons 412 to be displayed by the content item and to affect the selection of the content item, such that, for example, the consumer 102 can select the navigation icons 412 to change the highlighted content item from item 1 to item N, wherein the content items comprise the selected playlist. The system also presents a cancel option 419, to enable the consumer 102 to back out of viewing DVR playlists as part of playback UI 410.

In response to a particular playlist and content item being displayed in the command window 411, playlist information window 413 and item preview window 414 are displayed according to aspects of the system. Each of the windows 413, 414 present information about the associated playlist or content item shown in the command window 411. Information includes, but is not limited to: descriptions, names, contents, playback settings, plot synopses, cast, premier date, content rating, etc.

In FIG. 4B, a branching UI 420 is illustrated. Two content options 421, 422 are provided by aspects of the system for a consumer 102 to choose between. The system also presents a cancel option 429, to enable the consumer 102 to back out of viewing DVR playlists as part of branching UI 420. First option 421 is illustrated as highlighted by a consumer 102, such that on selection, item 1 from playlist 1 will be provisioned instead of item 7 from playlist 2 offered in second option 422. An optional countdown indicator 423 is illustrated so that at the end of an optional countdown period, if the consumer 102 has not made a selection, a selection of an option will be made by the system. As will be understood by one skilled in the art, more or fewer options may be presented that offer choices comprised of more or fewer content items and playlists.

Aspects of the system allow for the selected options to be tracked so as to affect future options presented. If, for example, a consumer 102 is presented with an automatically generated DVR playlist that branches, the system is operable to note which branches are selected and to further refine the DVR playlist or future-generated DVR playlists to account for the consumer's choices.

In another aspect, the system is operable to limit the presentation of branches based on previously selected branches. For example, a branching playlist may be set up by a parent to include a first play list comprised of content items enjoyed by a first child and a second playlist comprised of content items enjoyed by a second child. When a new content item is requested, such as, for example, at the conclusion of a previous content item, the branching playlist may present the children with a choice between content items on both associated playlists or may limit the presentation to content items present on a playlist other than the playlist a previous content item was selected from; the system may alternate which playlist content items are selected from, thus forcing the children to take turns. As will be understood, allowing the system to limit the presentation of playlists can operate with more or fewer playlists, content items, and options than used in the above example. As will also be understood, the system may limit presentation as a hard rule or as a soft rule, which respectively never allow repetitive presentation or reduce a likelihood of repetitive presentation.

Figure 5:
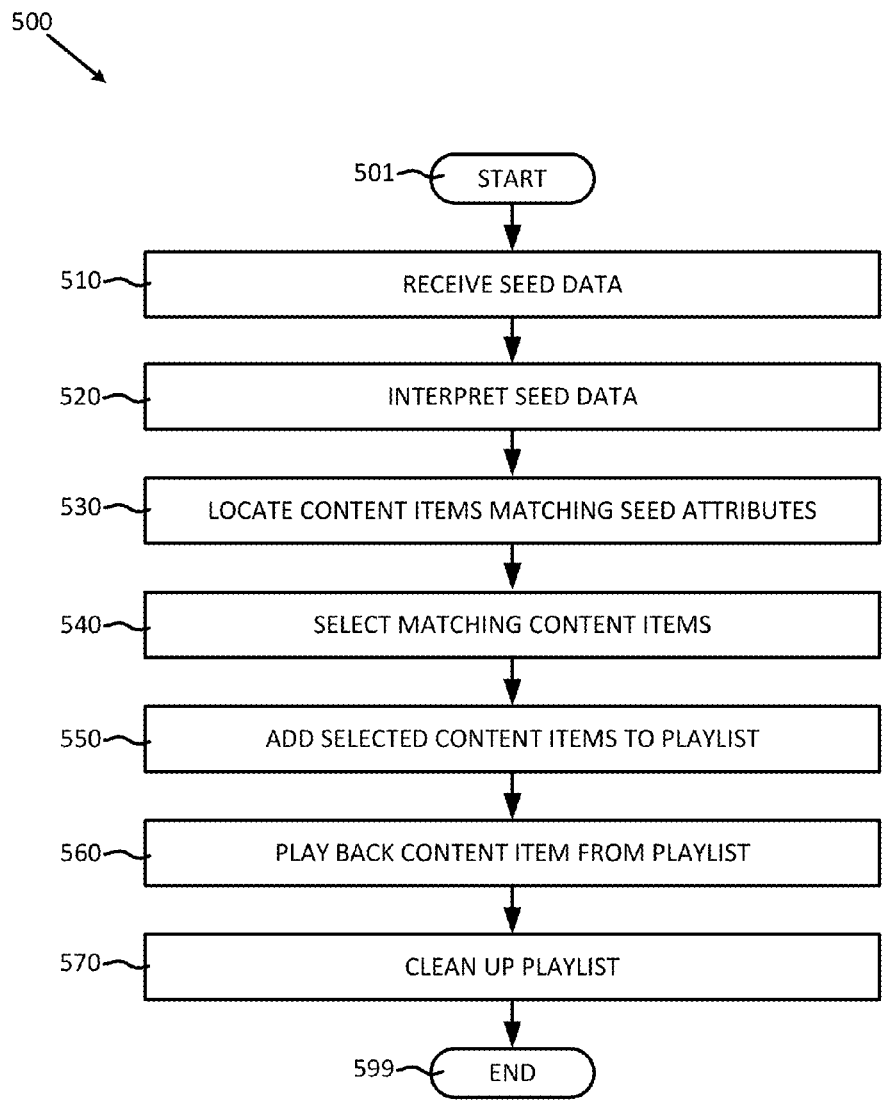
FIG. 5 is a high level flowchart of a method for building DVR playlists based on seeds.

FIG. 5 is a high level flowchart of a method 500 for building DVR playlists based on seeds. Method 500 begins at START 501 and proceeds to OPERATION 510 where seed data is received. Aspects allow for seed data to be received explicitly, for example, as is illustrated in FIG. 3B, or implicitly, for example, as is illustrated in FIG. 3C via parsing a selected content item for a seed data. Once the seed data has been received, method 500 proceeds to OPERATION 520 where the seed data is interpreted and the attributes of the received seed data are determined. The attributes are based, according to various aspects, on metadata determined by the system to be related to the seed and mood options available to the consumer 102 and an analysis of past consumer behavior. Method 600 continues to OPERATION 530 to locate content items that match the seed attributes determined in OPERATION 520. Once content items have been matched to the seed attributes, method 500 proceeds to OPERATION 540 where matching content items are selected based on the attributes, and any weighting associated with those attributes. Method 500 then proceeds to OPERATION 550 where the selected content items are added to the DVR playlist.

Method 500 then proceeds to OPERATION 560, where the content items comprising the DVR playlist are played back. Once playback has terminated for a content item (i.e., the playback is complete or an end of playback is otherwise communicated) method 500 proceeds to operation 570 for cleanup of the DVR playlist. According to various aspects, cleanup includes at least one of: removing the played back content item from the DVR playlist, retaining the played back content item on the DVR playlist but marking it as viewed (readable by a machine or by a consumer 102), and deleting the played back content item from a computer storage medium. As is discussed above, if cleanup includes deleting the played back content item from a computer storage medium, aspects of OPERATION 570 include checking the other DVR playlists associated with the computer storage medium from which the content item is to be deleted so that cleaning up the playback of one DVR playlist does not affect the playback of another DVR playlist (or force re-transmission and re-storage therefore). Method 500 then concludes at STOP 599.

Figure 6:
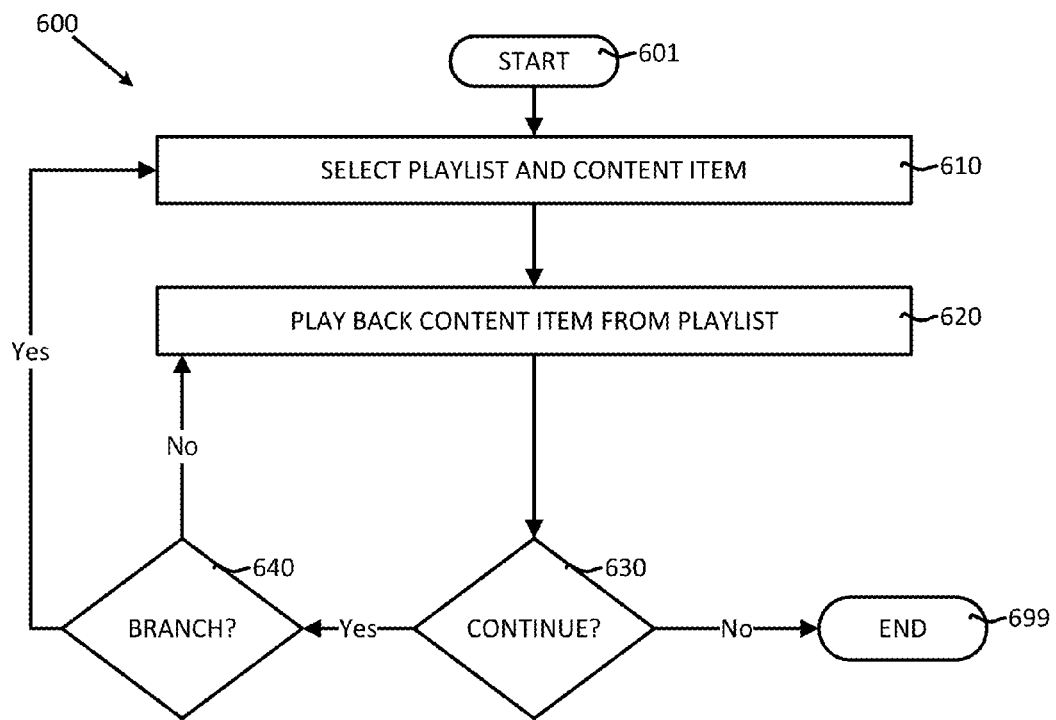
FIG. 6 is a high level flowchart of a method for playing back content from DVR playlists.

FIG. 6 is a high level flowchart of a method 600 for playing back content from DVR playlists. Method 600 begins at START 601 and proceeds to OPERATION 610, where a DVR playlist and a content item is selected. As will be understood, the selection of the DVR playlist or the content item may be manual or automatic according to various aspects. Method 600 proceeds to OPERATION 620 where the content item is played back from the DVR playlist. After playing back the content item, such as, for example, when the content item is complete or when a consumer 102 signals to display a different content item, method 600 proceeds to DECISION OPERATION 630, where a communication indicating whether to continue playing back content items is received. Such input may be automatically set by a system executing method 600, from a user prompt or as a result from a last content item from the DVR playlist being played back. When the input at DECISION OPERATION 630 indicates not to continue playing back content items, method 600 proceeds to END 699 where method 600 terminates.

When the input at DECISION OPERATION 630 indicates to continue playing back content items, method 600 proceeds to DECISION OPERATION 640, where it is determined whether playback is set up for branching. When it is determined at DECISION OPERATION 640 that playback is not to branch, method 600 returns to OPERATION 620 to automatically play back the next content item from the DVR playlist. As discussed above, playing back content items, according to various aspects, includes sequential, random, and user-selected playback options for selecting the next content item to provision from a DVR playlist, and may automatically delete previously played back content items from the DVR playlist or the DVR, or mark them as viewed and thereby prevent repeated playback within a single execution of method 600.

When it is determined at DECISION OPERATION 640 that playback is to branch, method 600 returns to OPERATION 610 to select another DVR playlist and content item. Branching playback may be enabled, as discussed above, with one or more DVR playlists for automatic or manual branching according to various aspects, and, may include or exclude content items from the previously selected DVR playlist when content items are presented for selection.

Figure 7:
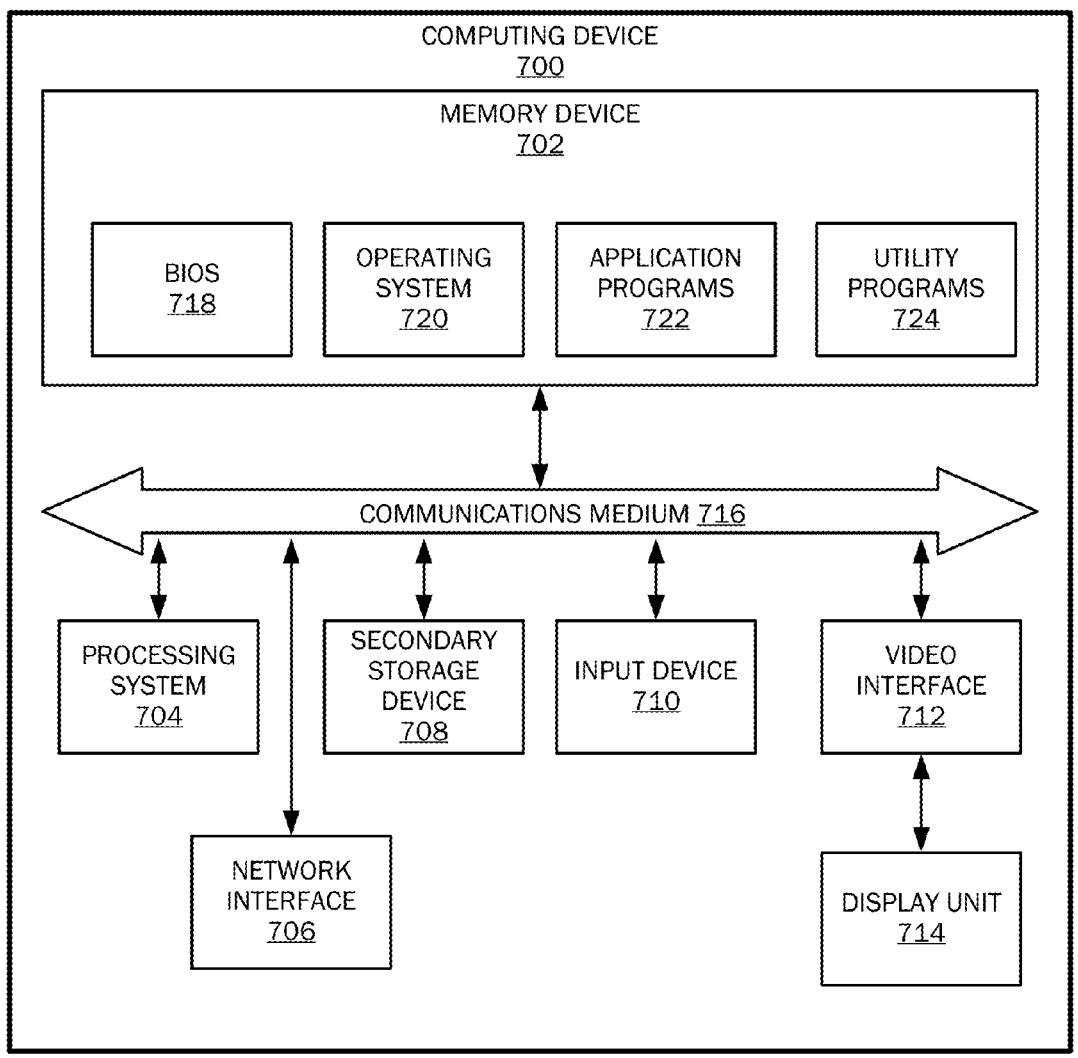
FIG. 7 is a block diagram illustrating example physical components of a computing device with which the various aspects of the invention are practiced.

FIG. 7 is a block diagram illustrating example physical components of a computing device 700 with which embodiments of the present invention may be practiced. In some embodiments, one or a combination of the components of the system 100 are implemented using one or more computing devices like the computing device 700. It should be appreciated that in other embodiments, one or a combination of the components of the system 100 may be implemented using computing devices having hardware components other than those illustrated in the example of FIG. 7.

Computing devices may be implemented in different ways in different embodiments. For instance, in the example of FIG. 7, the computing device includes a processing system 704, memory device 702, a network interface 706, a secondary storage device 708, an input device 710, a video interface 712, communicated with a display unit 714, and a communications medium 716. In other embodiments, the computing device 700 may be implemented using more or fewer hardware components or in combination with other types of computer systems and program modules. The memory device 702 includes one or more computer-readable storage media capable of storing data or computer-executable instructions that, when executed by processor 704, provide preset user group functionality as described herein.

The memory device 702 includes one or more computer-readable storage media capable of storing data or computer-executable instructions. Memory device 702 thus may store the computer-executable instructions that, when executed by processing system 704, automatically switching the user based on usage data as described with reference to FIGS. 1-6. In various embodiments, the memory device 702 is implemented in various ways. For example, the memory device 702 can be implemented as various types of computer-readable storage media. Example types of computer-readable storage media include, but are not limited to: solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

The term computer-readable media includes transmission media and computer-readable storage media. The term transmission media includes communication and information delivery media. Computer-executable instructions, data structures, and program modules may be embodied on a transmission medium. For example, transmission media can include wired media, such as a wired network or direct-wired connection, and wireless media, such as acoustic, radio frequency (RF), infrared, and other wireless media.

The term computer-readable storage medium (and its plural: computer-readable storage media) refers to devices and articles of manufacture that store data or computer-executable instructions readable by a computing device. The term computer-readable storage medium does not include transmission media. The term computer-readable storage medium encompasses volatile and nonvolatile, and removable and non-removable media implemented in various methods or technologies for storage and retrieval of information. Such information can include data structures, program modules, computer-executable instructions, or other data.

The secondary storage device 708 includes one or more computer-readable storage media, and may store data and computer-executable instructions not directly accessible by the processing system 704. That is, the processing system 704 performs an I/O operation to retrieve data or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to, and receive data from, a communication network via a network interface 706. In different embodiments, the network interface 706 is implemented in different ways, such as an Ethernet interface, a token-ring network interface, a fiber optic network interface, a wireless network interface (e.g., Wi-Fi, Wi-Max, etc.), or another type of network interface. The network interface 706 may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 710 enables the computing device 700 to receive input from a user. Example types of input devices include, but are not limited to: keyboards, mice, trackballs, stylus input devices, keypads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 may be a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory device 702, the processing system 704, the network interface 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

The memory device 702 stores various types of data or software instructions. For instance, in the example of FIG. 7, the memory device 702 stores a Basic Input/Output System (BIOS) 718 and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory device 702 also stores one or more application programs 722 that, when executed by the processing system 704, cause the computing device 700 to provide applications to users. The memory device 702 also stores one or more utility programs 724 that, when executed by the processing system 704, cause the computing device 700 to provide utilities to other software programs.

Embodiments of the present invention may be used in various distributed computing environments where tasks are performed by remote processing devices that are linked through a communications network in a distributed computing environment.

Figure 8:
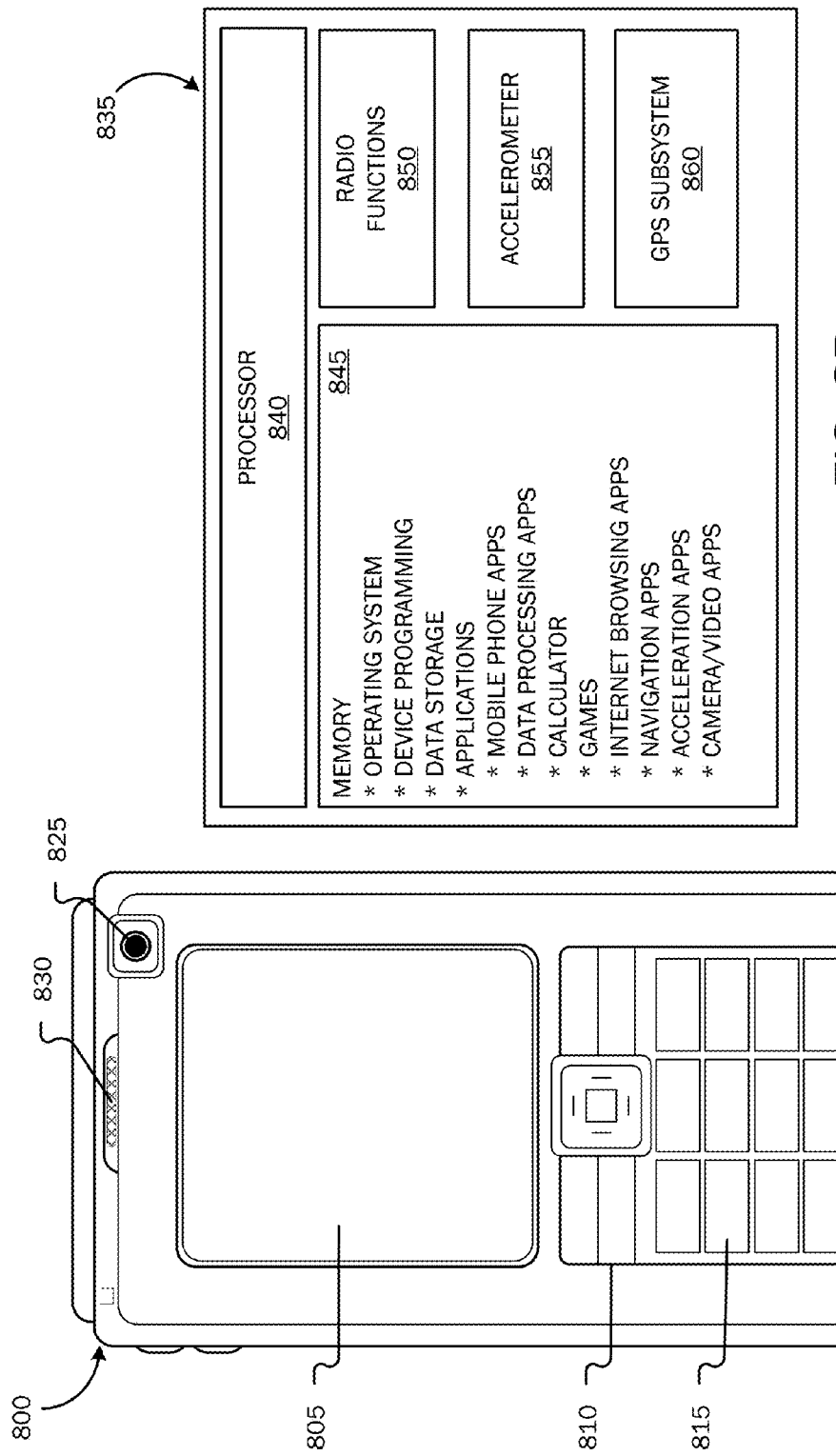
FIGS. 8A-B illustrate a suitable mobile computing environment with which the various aspects of the invention are practiced.

FIGS. 8A and 8B illustrate a suitable mobile computing environment, for example, a mobile computing device 800 embodied as a mobile phone, a tablet computing device, a laptop computer, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the mobile computing device 800 may be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device, or any other suitable input means. Data may be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be used for storing a device operating system, device programming, one or more stored applications, for example, mobile telephone applications, data processing applications, calculators, games, Internet browsing applications, navigation applications, acceleration applications, camera or video applications, etc.

Mobile computing device 800 may contain an accelerometer 855 for detecting acceleration, and can be used to sense orientation, vibration, or shock. Mobile computing device 800 may contain a global positioning system (GPS) subsystem (e.g., GPS send/receive functionality) 860. A GPS subsystem 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennas, for allowing the mobile computing device 800 to communicate with other communication devices and systems via a wireless network. Radio functions 850 may be used to communicate with a wireless or WIFI-based positioning system to determine the location of a mobile computing device 800.

Figure 9:
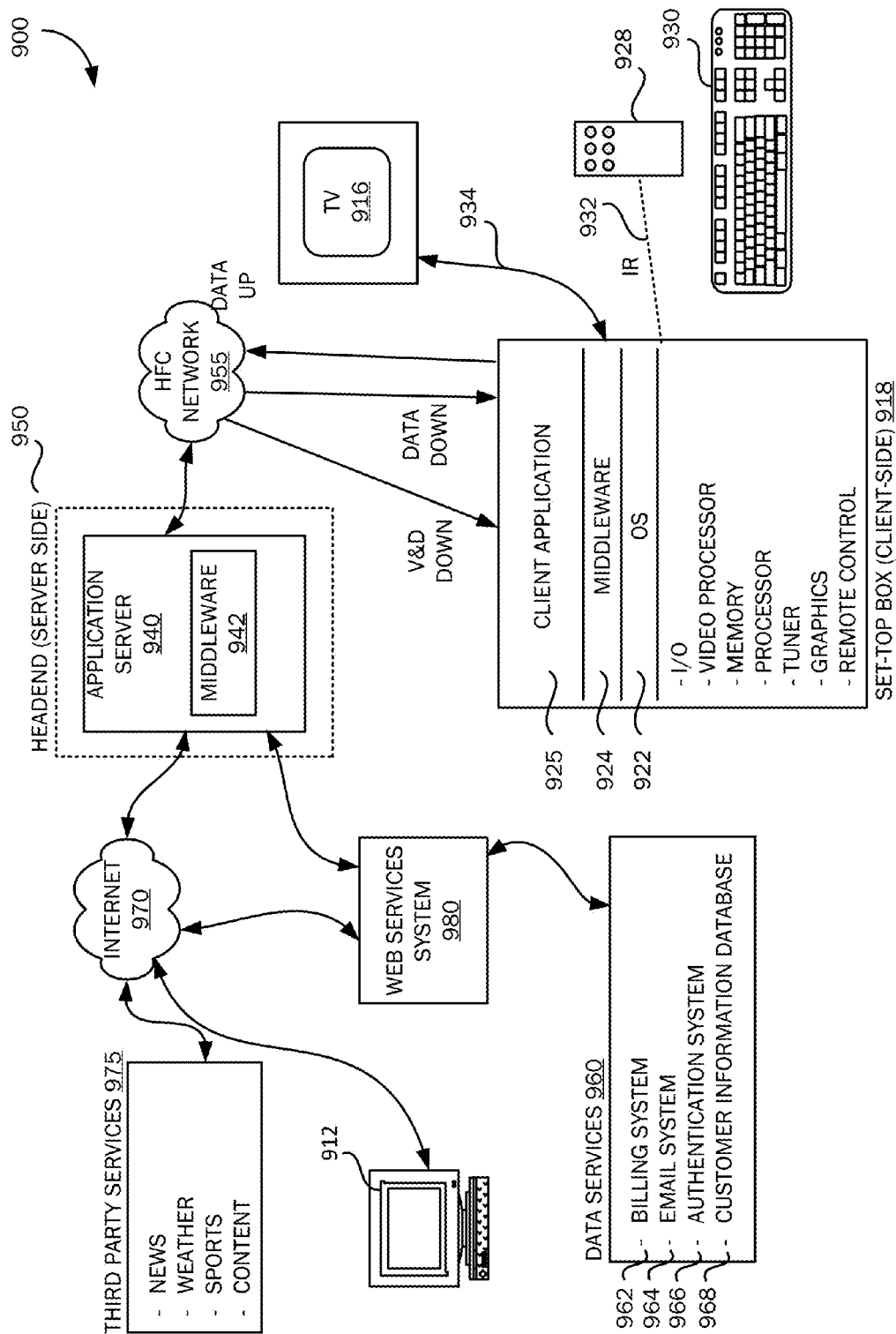
FIG. 9 is a simplified block diagram illustrating one example of a cable television services system providing the various aspects of the invention.

FIG. 9 is a simplified block diagram illustrating one embodiment of a cable television services (CATV) system 900 providing an operating environment. As can be appreciated, a CATV architecture 900 is but one of various types of systems that may be used to provide the embodiments of the present invention. Referring now to FIG. 9, digital and analog video programming, information content and interactive television services are provided via a hybrid fiber coax (HFC) network 955 to a television set 916 for consumption by a CATV customer. As is known to those skilled in the art, HFC networks 955 combine both optical fiber and coaxial cable lines. Typically, optical fiber runs from the cable head end 950 to neighborhoods of subscribers. Coaxial cable runs from the optical fiber feeders to each customer or subscriber. The functionality of the HFC network 955 allows for efficient bidirectional data flow between the client-side STB 918 and a server-side application server 940.

The CATV system 900 is in the form of a distributed client-server computing system for providing video and data flow across the HFC network 955 between server-side services providers (e.g., cable television/services providers) via a server-side head end 950 and a client-side customer via STB 918 in communication with a customer receiving device, such as the television set 916. As is understood by those skilled in the art, modern CATV systems 900 may provide a variety of services across the HFC network 955 including traditional digital and analog video programming, telephone services, high speed Internet access, video-on-demand, and information services.

On the client side of the CATV system 900, digital and analog video programming, and digital and analog data are provided to the customer television set 916 via the STB 918. Interactive television services that allow a customer to input data to the CATV system 900 likewise are provided by the STB 918. As illustrated in FIG. 9, the STB 918 is a multipurpose computing device having a computer processor, memory, and an input/output mechanism. The input/output mechanism receives input from server-side processes via the HFC network 955 and from customers via input devices such as the remote control device 928, keyboard 930, or other computing device, such as a tablet/slate computer, mobile computing device, etc. The remote control device 928 and the keyboard 930 may communicate with the STB 918 via a suitable communication transport such as the infrared connection 932. The STB 918 also includes a video processor for processing and providing digital and analog video signaling to the television set 916 via a cable communication transport 934. A multi-channel tuner is provided for processing video and data to and from the STB 918 and the server-side head end system 950, described below.

The STB 918 also includes an operating system 922 for directing the functions of the STB 918 in conjunction with a variety of client applications 925. For example, if a client application 925 requires a news flash from a third-party news source to be displayed on the television set 916, the operating system 922 may cause the graphics functionality and video processor of the STB 918, for example, to output the news flash to the television set 916 at the direction of the client application 925 responsible for displaying news items.

Because a variety of different operating systems 922 may be used by a variety of different brands and types of STB 918, a middleware layer 924 may be provided to allow a given software application to be executed by a variety of different operating systems 922. According to an aspect, the middleware layer 924 may include a set of application programming interfaces (APIs) that are exposed to client applications 925 and operating systems 922 that allow the client applications to communicate with the operating systems 922 through common data calls understood via the API set. As described below, a corresponding middleware layer 942 is included on the server side of the CATV system 900 for facilitating communication between the server-side application server 940 and the client-side STB 918. The middleware layer 942 of the server-side application server 940 and the middleware layer 924 of the client-side STB 918 may format data passed between the client side and server side according to the Extensible Markup Language (XML).

According to one aspect, the STB 918 passes digital and analog video and data signaling to the television set 916 via a one-way communication transport 934. According to other aspects, two-way communication transports may be used, for example, via high definition multimedia (HDMI) ports. The STB 918 may receive video and data from the server side of the CATV system 900 via the HFC network 955 through a video/data downlink and data via a data downlink. The STB 918 may transmit data from the client side of the CATV system 900 to the server side of the CATV system 900 via the HFC network 955 via one data uplink. The video/data downlink is an "in band" downlink that allows for digital and analog video and data signaling from the server side of the CATV system 900 through the HFC network 955 to the STB 918 for use by the STB 918 and for distribution to the television set 916. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 9, between the HFC network 955 and the STB 918 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side STB 918 and the server-side application server 940 is typically passed through the "out of band" data links. Alternatively, an "in band" data carousel may be positioned in an "in band" channel into which a data feed may be processed from the server-side application server 940 through the HFC network 955 to the client-side STB 918. Operation of data transport between components of the CATV system 900, described with reference to FIG. 9, is well known to those skilled in the art.

Referring still to FIG. 9, the head end 950 of the CATV system 900 is positioned on the server side of the CATV system 900 and includes hardware and software systems responsible for originating and managing content for distributing through the HFC network 955 to client-side STBs 918 for presentation to customers via television sets 916. As described above, a number of services may be provided by the CATV system 900, including digital and analog video programming, interactive television services, telephone services, video-on-demand services, targeted advertising, and provision of information content.

The application server 940 is a computing system operative to assemble and manage data sent to and received from the client-side STB 918 via the HFC network 955. As described above with reference to the STB 918, the application server 940 includes a middleware layer 942 for processing and preparing data from the head end 950 of the CATV system 900 for receipt and use by the client-side STB 918. For example, the application server 940 via the middleware layer 942 may obtain data from third-party services 975 via the Internet 970 for transmitting to a customer through the HFC network 955 and the STB 918. For example, content data and metadata of a third party service 975 may be downloaded by the application server 940 via the Internet 970. When the application server 940 receives the downloaded third party services 975, the middleware layer 942 may be used to format the content metadata for receipt and use by the STB 918. Therefore, content metadata may be sent and categorized based on the availability to the customer's program guide data According to one aspect, data obtained and managed by the middleware layer 942 of the application server 940 is formatted according to the Extensible Markup Language and is passed to the STB 918 through the HFC network 955 where the XML-formatted data may be used by a client application 925 in concert with the middleware layer 924, as described above. As should be appreciated by those skilled in the art, a variety of third-party services data 975, including news data, weather data, sports data and other information content may be obtained by the application server 940 via distributed computing environments such as the Internet 970 for provision to customers via the HFC network 955 and the STB 918. Similarly, content (e.g., Internet television content and other internet protocol video-based content) is displayed to the customer on the user's client device 912.

According to aspects, the application server 940 obtains customer support services data, including billing data, information on customer work order status, answers to frequently asked questions, services provider contact information, and the like from data services 960 for provision to the customer via an interactive television session. As illustrated in FIG. 9, the services provider data services 960 include a number of services operated by the services provider of the CATV system 900, which may include data on a given customer.

A billing system 962 may include information such as a customer's name, street address, business identification number, Social Security number, credit history, and information regarding services and products subscribed to by the customer. According to aspects, the billing system 962 may also include billing data for services and products subscribed to by the customer for bill processing, billing presentment and payment receipt.

An email system 964 may include information such as user accounts, address books, archived messages, subscriber profiles, subscribers IDs, and passwords used by customers for access to electronic mail services.

An authentication system 966 may include information such as secure user names, subscriber profiles, subscriber IDs, and passwords used by customers for access to network services.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 962, 964, 966, 968 may be integrated or provided in any combination of separate systems, wherein FIG. 9 shows only one example.

Referring still to FIG. 9, web services system 980 is illustrated between the application server 940 and the data services 960. According to aspects, web services system 980 serves as a collection point for data requested from each of the disparate data services systems comprising data services 960. According to aspects, when the application server 940 requires customer services data from one or more of the data services 960, the application server 940 passes a data query to the web services system 980. The web services system formulates a data query to each of the available data services systems 960 for obtaining any required data for a requesting customer as identified by an STB-identification associated with the customer. The web services system 980 serves as an abstraction layer between the various data services systems 960 and the application server 940. That is, the application server 940 is not required to communicate with the disparate data services systems 960, nor is the application server 940 required to understand the data structures or data types used by the disparate data services systems 960. The web services system 980 is operative to communicate with each of the disparate data services systems 960 for obtaining necessary customer data. The customer data obtained by the web services system 980 is assembled and is returned to the application server 940 for ultimate processing via the middleware layer 942, as described above.

Embodiments the invention may be used in combination with any number of computer systems, such as in desktop environments, laptop or notebook computer systems, multiprocessor systems, micro-processor based or programmable consumer electronics, networked PCs, mini computers, mainframe computers, mobile communication device systems and the like. Embodiments of the present invention may be used in various distributed computing environments where tasks are performed by remote processing devices that are linked through a communications network in a distributed computing environment, and where programs may be located in both local and remote memory storage.

Embodiments, for example, are described above with reference to block diagrams or operational illustrations of methods, systems, and computer program products according to embodiments. The functions/acts noted in the blocks may occur out of the order as shown in any flowchart or described herein with reference to the figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering, inserting, or deleting a step or process, without departing from the embodiments.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for provisioning DVR playlists, comprising, receiving a seed: determining attributes of the seed; retrieving subscriber account permissions associated with a subscriber account; identifying a content item that includes metadata matching the attributes of the seed; locating at least one of: a copy of the content item being streamed; a copy of the content item on a DVR associated with the subscriber account; a copy of the content item on a service provider server; and a copy of the content item on a third-party server; determining whether a located copy of the content item is permitted by the subscriber account permissions; selecting one of the a permitted located copies copy determined to be an available content item; adding the available content item to a first DVR playlist; playing back the available content item from the first DVR playlist; in response to playing back the available content item from the first DVR playlist, indicating via the first DVR playlist the available content item as viewed; in response to indicating via the first DVR playlist the available content item as viewed, determining whether a second DVR playlist associated with the subscriber account includes the available content item; when the second DVR playlist associated with the subscriber account includes the available content item, determining whether the second DVR playlist indicates the available content item as viewed; when the second DVR playlist indicates the available content item as viewed, removing the available content item from the first DVR playlist and the second DVR playlist; determining whether a local copy of the available content item exists on the DVR associated with the subscriber account and when it is determined that the local copy exists, deleting the local copy.

2. The method of claim 1, wherein the seed is based on a displayed content item, receiving the seed further comprises: receiving a selection of the displayed content item; analyzing the displayed content item for metadata indicating a tone; adding the displayed content item to the first DVR playlist; and in response to adding the displayed content item to the first DVR playlist, playing back the displayed content item.

3. The method of claim 1, further comprising: wherein determining the attributes of the seed further comprises analyzing past consumer behavior to affect a weighting of the attributes; and wherein identifying the content item that includes metadata matching the attributes of the seed further comprises, selecting the content item determined to have a highest weighting as the identified content item.

4. The method of claim 1, further comprising: in response to playing back the available content item from the first DVR playlist, providing a user interface to present a plurality of available content items, wherein the user interface is operable to transmits a selection of one of the plurality of available content items to play back as a next available content item.

5. The method of claim 1, further comprising receiving a request for branching playback including: selecting the second DVR playlist, comprised of different available content items; in response to indicating the available content item as viewed, branching playback to the second DVR playlist, wherein a next available content item is selected from the different available content items comprising the second DVR playlist; and in response to branching playback to the second DVR playlist, playing back the next available content item.

6. A system for provisioning DVR playlists, comprising: a processor; and a memory storage including instructions, which when executed by the processor are operable to: receive a seed; determine attributes of the seed; retrieve subscriber account permissions associated with a subscriber account; identify a content item that includes metadata matching the attributes of the seed; locate at least one of: a copy of the content item being streamed; a copy of the content item on a DVR associated with the subscriber account; a copy of the content item on a service provider server; and a copy of the content item on a third-party server; determine whether a located copy of the content item is permitted by the subscriber account permissions; select one of the a permitted located copies copy determined to be an available content item; add the available content item to a first DVR playlist; play back the available content item from the first DVR playlist; in response to playing back the available content item from the first DVR playlist, indicate via the first DVR playlist the available content item as viewed, in response to indicating via the first DVR playlist the available content item as viewed, determine whether a second DVR playlist associated with the subscriber account includes the available content item: when the second DVR playlist associated with the subscriber account includes the available content item, determine whether the second DVR playlist indicates the available content item as viewed when the second DVR playlist indicates the available content item as viewed, remove the available content item from the first DVR playlist and the second DVR playlist; determine whether a local copy of the available content item exists on the DVR associated with the subscriber account and when it is determined that the local copy exists, delete the local copy.

7. The system of claim 6, wherein the seed is based on a displayed content item, to receive the seed, the system is further operable to: receive a selection of the displayed content item; analyze the displayed content item for metadata indicating a tone for the displayed content item; add the displayed content item to the first DVR playlist; and in response to adding the displayed content item to the first DVR playlist, play back the displayed content item.

8. The system of claim 6, wherein to determine the attributes of the seed, the system is further operable to analyzes past consumer behavior to affect a weighting of the attributes; and wherein, to identify the content item that includes metadata matching the attributes of the seed, the system is further operable to selects the content item determined to have a highest weighting as the identified content item.

9. The system of claim 6, further operable to: in response to playing back the available content item from the first DVR playlist, provide a user interface to present a plurality of available content items, wherein the user interface is operable to transmit a selection of one of the plurality of available content items to play back as a next available content item.

10. The system of claim 6, further operable to: receive a request for branching playback including: the second DVR playlist, comprised of different available content items; in response to indicating the available content item as viewed, branch playback to the second DVR playlist, wherein a next available content item is selected from the different available content items comprising the second DVR playlist; and in response to branching playback to the second DVR playlist, play back the next available content item.

11. A playlist engine for provisioning DVR playlists, comprising: a processor; and a memory storage including instructions, which when executed by the processor are operable to provide: a communication module, operable to receive communications indicating content items to be displayed on an endpoint device; a construction module, operable to build a playlist comprising the indicated content items; an availability module storing subscriber account permissions, operable to locate the content items comprising the playlist and determine whether the content items comply with the subscriber account permissions; a provision module, operable to determine an order for the content items comprising the playlist and to enable the display of the content items according to the order on the endpoint device receive a seed: determine attributes of the seed use subscriber account permissions associated with a subscriber account identify a content item that includes metadata matching the attributes of the seed locate at least one of: a copy of the content item being streamed a copy of the content item on a DVR associated with the subscriber account; a copy of the content item on a service provider server and a copy of the content item on a third-party server; determine whether a located copy of the content item is permitted by the subscriber account permissions: select a permitted located copy determined to be an available content item add the available content item to the first DVR playlist; play back the available content item from the first DVR playlist; in response to playing back the available content item from the first DVR playlist, indicate via the first DVR playlist the available content item as viewed in response to indicating via the first DVR playlist the available content item as viewed, determine whether a second DVR playlist associated with the subscriber account includes the available content item: when the second DVR playlist associated with the subscriber account includes the available content item, determine whether the second DVR playlist indicates the available content item as viewed when the second DVR playlist indicates the available content item as viewed, remove the available content item from the first DVR playlist and the second DVR playlist determine whether a local copy of the available content item exists on the DVR associated with the subscriber account and when it is determined that the local copy exists, delete the local copy.

12. The playlist engine of claim 11, further comprising a selection module, operable to parse metadata from the communications to interpret the seed, wherein the seed indicates content items to be displayed on the endpoint device based on matching metadata.

13. The playlist engine of claim 11, wherein an order for content items is a branching order, wherein multiple content items are presented for selection as a next-to-display content item on the endpoint device at termination of a currently-displayed content item.

14. The playlist engine of claim 13, further wherein the provision module is further operable to present the multiple content items for selection as the next-to-display content item from a plurality of playlists.

15. The playlist engine of claim 11, wherein the provision module is further operable to: enable content items for display by downloading the content items to a computer storage medium associated with the endpoint device; determine whether the content items stored by the computer storage medium associated with the endpoint device have been displayed from each playlist that the content items comprise; and when the content items stored by the computer storage medium associated with the endpoint device have been displayed from each playlist that the content items comprise, automatically remove the content items from the computer storage medium associated with the endpoint device.

16. The playlist engine of claim 11, wherein the availability module is further operable to locate content items from at least one of: a content item stream; a DVR local to an endpoint device; a DVR networked to the endpoint device; a service provider of the endpoint device; and a third-party service available to the endpoint device.

17. The playlist engine of claim 11, wherein the communications indicating content items to be displayed on the endpoint device further to identify a desired playlist comprising the indicated content items.

18. The playlist engine of claim 11, wherein the construction module is further operable to-remove the content items from the first DVR playlist or the second DVR playlist in response to termination of a currently-displayed content item.

* * * * *